United States Patent [19]

Ishibashi et al.

[11] 4,097,311

[45] Jun. 27, 1978

[54] ABSORPTION SURFACE OF SOLAR COLLECTOR

[75] Inventors: Toshihiro Ishibashi; Kinya Horibe; Masaharu Ishida; Youzi Sano, all of Kosai, Japan

[73] Assignee: Yazaki Sogyo Kabushiki Kaisha, Tokyo, Japan

[21] Appl. No.: 715,309

[22] Filed: Aug. 18, 1976

[30] Foreign Application Priority Data

Sep. 22, 1975 Japan .................................. 50-113747

[51] Int. Cl.$^2$ ................................................ C23F 7/04
[52] U.S. Cl. ................................ 148/6.21; 148/6.14 R; 148/6.15 R; 148/6.35; 148/31.5; 427/34; 427/162; 427/248 R; 204/192 SP; 204/192 P; 428/472; 428/913
[58] Field of Search ............ 148/6.21, 6.15 R, 6.14 R, 148/6.35, 6.11, 31.5; 204/192 P, 192 SP; 428/472, 913; 427/34, 162, 248 R

[56] References Cited

U.S. PATENT DOCUMENTS

| | | | |
|---|---|---|---|
| 2,394,899 | 2/1946 | Clingan | 148/6.11 |
| 2,528,717 | 11/1950 | Batcheller | 148/6.21 X |
| 3,125,471 | 3/1964 | Conner | 148/6.35 X |
| 3,210,220 | 10/1965 | Clegg | 148/6.21 |
| 3,915,759 | 10/1975 | Smollett et al. | 148/6.11 |
| 3,963,530 | 6/1976 | Smollett et al. | 148/6.11 |

*Primary Examiner*—Ralph S. Kendall

*Attorney, Agent, or Firm*—Oldham, Oldham, Hudak & Weber Co.

[57] ABSTRACT

The present invention relates to a selective absorption surface of a solar collector in which a coating layer consisting of the predetermined composition of metal oxide is tightly adhered to a substrate having the mirror-like surface in the predetermined thickness.

The composition of metal oxide consists of those comprising 0.001 − 0.15 wt % of C, 0.005 − 3.00 wt % of Si, 0.005−10.00 wt % of Mn, 11.00 − 30.00 wt % of Cr, 0.005 − 22.00 wt % of Ni, optionally, 0.75 − 5.00 wt % of Mo and the balance being Fe or those comprising instead of Cr, 0.001 − 5.0 wt % of at least one of metals selected from the group of N, Cu, Al, V, Y, Ti, Nb, Ta, U, Th, W, Zr, and Hf, the atom ratio of Metal/Carbon + additional element being more than 5.0. An acidic oxidation method and an alkaline oxidation method are applied to manufacture oxide of the metal compositions.

It has been observed that the superior selective absorption surface showing high energy absorption factor at a wave length of 0.3 − 2.5 $\mu$m and low energy radiative factor at a wave length of 3 −50 $\mu$m is manufactured by coating said oxide of the metal composition at a thickness of 500 − 2000 Å on the base plate having the mirror-like surface of arithmetical mean deviation (Ra) less than 0.07$\mu$ or ten point height (RZ) less than 0.2$\mu$ determined according to the method of ISO Recommendation R 468.

14 Claims, 13 Drawing Figures

ABSORPTION SURFACE OF SOLAR COLLECTOR

BACKGROUND OF THE INVENTION

The present invention relates to an acceptive surface for the selective absorption of solar radiation. Especially, the present invention relates the acceptive surface for the selective absorption of solar radiation (hereinafter referred to as the selective absorption surface of the solar collector) in which the coating layer of metal oxide formed from the certain metal composition is adhered on the substrate having the mirror-like surface in the predetermined thickness.

It has been well-known a method for collecting solar radiation utilizing the greenhouse effect that a covering material having properties of opacity in an infrared wave length and transparency in a visible wave length is covered on the base surface precoated with a substance having the property neighboring black body, for example a black pigment, said coating substance having the greenhouse effect and the effect of decreasive convention heat loss coming from a conventional conduction. The prior conventional method is satisfactorily carried out when the operating temperature of the solar collector is less than about 50° C, but when said temperature raises more than about 50° C, said method displays a disadvantage of greatly depressing the efficiency of collecting heat in the solar collector. To remove the disadvantage as mentioned above, it has been well-known to use a conventional selective absorption surface having the spectorscopic properties of showing the same energy absorptance that of the black body in the wave lengths (0.3 – 2.5 $\mu$m) of solar radiation and the low emittance in the wave lengths of 3 – 50 $\mu$m at the operating temperature of 100° C which is the same temperature to the operating temperature of the solar collector. It is difficult to obtain the selective absorption surface of the solar collector having the spectroscopic features as mentioned above by nature.

As a zinc plate polished enough and a copper plate naturally oxidated in air merely display the selective absorbing property of solar radiation, even if said plates are applied to the solar collector, it is in-sufficient to remove the disadvantage(s) of the prior solar collector in which the greenhouse effect of the black pigment etc. is utilized, so that an attempt of artificially forming the selective absorption surface of the solar collector has been effected. It has been used as the prior selective absorption surface of the solar collector artificially formed, a surface of copper plate coated with copper oxide thereon by a chemical treatment, a surface of galvanized iron sheet plated with nickel sulfide and a double coated surface coated the substrate having the mirror-like surface with a film having properties of opacity in the visible wave lengths and of transparency in the infrared wave lengths and then with a transparent film having the property of preventing the reflection of solar radiation by vacuum evaporation, spattering and arc discharging methods, for example, a surface coated the aluminum substrate with silicon metal and then with SiO$_2$ to prevent the reflection of solar radiation. The vacuum evaporation method has been considered to be one of the most reliable method among the methods for forming the selective absorption surface of the solar collector having the effect of preventing the reflection by the interference effect of the coating films, by the reasons that the thickness of each films must be controlled and the substances (simple substance or compounds) of each film must be selected optionally, namely each film having the appropriate refractive index must be adhered each other on the base surface. Special vacuum evaporating for example, spattering and arc methods have been developed since each film manufactured by the normal vacuum evaporating method is not sufficient to adhere each other to the substrate. But, as the evaporating method itself possesses some disadvantages about the production efficiency and the cost, some attempts of forming the selective absorption surface with anti-refraction surface by a method other than the vacuum evaporating method namely a chemical dry and wet methods and a plating method have been effected.

For example, in the plating method, the selective absorption surface having the effects of the selective absorption and of preventing the reflection coming from the interference effect of the coating films, is produced by forming the coating film of nickel sulfide or the coating films of nickel-zinc sulfide and zinc sulfide on an aluminum plate or a galvanized iron plate. In the chemical treating method, the selective absorption surface having the effects as mentioned above, is produced by forming metal oxide on the steel plate or the stainless steel plate according to the same method to the nickel sulfide method as mentioned above.

Although the coating film formed by the dry and wet chemical methods as well as that formed by the vacuum evaporating and special vacuum evaporating methods displays the selective absorption property, it is necessary to select the proper rang of thickness of the coating film formed by the chemical methods to produce the selective absorption surface having the same selective absorption property to those formed by the vacuum evaporating and special vacuum evaporating methods.

SUMMARY OF THE INVENTION

The object of the present invention relates to providing the selective absorption surface of the solar collector in which the coating film consisting of the predetermined composition of metal oxide is tightly adhered to the substrate having the mirror-like surface of the predetermined roughness in the certain thickness, said metal oxide of the coating film being selected from those having the property of the selective absorption and the effect of preventing the reflection of solar radiation by the interference effect of the film.

DETAILED DESCRIPTION OF THE PREFERRED EMBODIMENTS

Metal Composition

One of the metal compositions used in the present invention is that of 0.001 – 0.15 wt % of C, 0.005 14 3.00 wt % of Si, 0.005 – 10.00 wt % of Mn, 11.00 – 30.00 wt % of Cr. 0.005 – 22.00 wt % of Ni, optionally 0.75 – 5.00 wt % of Mo and the balance being Fe. Said metal composition corresponds to that of the stainless steel commonly put on the market for example, 0.005 – 0.08 wt % of C, 0.005 – 1.00 wt % of Si, 0.005 – 2.00 wt % of Mn, 8.00 – 10.50 wt % of Ni, 18.00 14 20.00 wt % of Cr, and the balance being Fe (683/XIII 11 (ISO), 304 (AISI)); 0.005 – 0.08 wt % of C, 0.005 – 1.00 wt % of Si, 0.005 – 2.00 wt % of Mn, 10.00 – 14.00 wt % of Ni, 16.00 – 18.00 wt % of Cr, 2.00 – 3.00 wt % of Mo and the balance being Fe (683/XIII 20 (ISO), 316 (AISI)); 0.005 – 0.12 wt % of C, 0.005 – 0.75 wt % of Si, 0.005 – 1.00 wt % of Mn; 0.005 – 0.60 wt % of Ni, 16.00 – 18.00 wt % of Cr and the balance being Fe (683/XIII 8 (ISO), 430 (AISI)); 0.005 – 0.12 wt % of C, 0.005 – 1.00 wt % of Si, 0.005 – 1.00 wt % of Mn, 0.005 – 0.60 wt % of Ni, 16.00 – 18.00 wt % of Cr, 0.75 – 1.25 wt % of Mo and the balance being Fe (434 (AISI)) and the other stainless steel having the similar metal composition to those mentioned above. When the stainless steel is used as the metal composition, the martensitic stainless steel is not appropriate but the ferritic and austenitic stainless steels are suitable to use as the metal composition of the solar collector, in view of the weldability.

Another one of the metal compositions used in the present invention is the stainless steel having low carbon content compounding other metal to improve the anticorrosion, the formability and the weldability, for example, 0.001 – 0.15 wt % of C, 0.005 – 3.00 wt % of Si, 0.005 – 10.00 wt % of Mn, 11.00 – 30.00 wt % of Cr and 0.001 – 5.00 wt % of at least one of element(s) selected from the group of N, Cu, Al, V, Y, Ti, Nb, Ta, U, Th, W, Zr and Hf, optionally, 0.75 – 5.00 wt % of Mo and the balance being of Fe, Me/C + N ratio being more than 5.0, while said ratio being more than 8.0 in the stainless steel comprising Nb, Ta, or Ti as the additional element. Said metal compositions corresponding to those of the stainless steel commonly put on the market, for example, 0.005 – 0.03 wt % of C, 0.005 – 0.75 wt % of Si, 0.005 – 1.00 wt % of Mn, 16.00 – 18.00 wt % of Cr, 0.1 – 1.0 wt % of Ti, and the balance being Fe; 0.005 – 0.03 wt % of C, 0.005 – 0.75 wt % of Si, 0.005 – 1.00 wt % of Mn, 16.00 – 18.00 wt % Cr, 0.1 – 1.0 wt % of Ti, 0.75 – 1.25 wt % of Mo and the balance being Fe.

Further another one of the metal compositions used in the present invention is the stainless steel having low carbon content compounding other metal to improve tha anticorrosion, the formability and the weldability, for example 0.001 – 0.15 wt % of C, 0.005 – 3.00 wt % of Si, 0.005 – 10.00 wt % of Mn, 0.005 – 22.00 wt % of Ni, 11.00 – 30.00 wt % of Cr and 0.001 – 5.00 wt % of at least one of element(s) selected from the group of N, Cu, Al, V, Y, Ti, Nb, Ta, U, Th, W, Zr and HF, optionally, 0.75–5.00 wt % of Mo and the balance being of Fe, Me/C + N ratio being more than 5.0, while said ratio being more than 8.0 in the stainless steel comprising Nb, Ta, or Ti as the additional element.

FORMATION OF METAL OXIDE

Method for manufacturing metal oxide from the metal composition are shown as follows:

(1) Methods for manufacturing metal oxide by the wet and dry chemical treatments.

(2) Chemical treating method for manufacturing metal oxide of the stainless steel after the stainless steel having the predetermined metal composition is tightly adhered on the substrate having the mirror-like surface other than said stainless steel.

(3) Methods for manufacturing metal oxide of the stainless steel by means of the vacuum evaporation method, the spattering method and the arc discharging method after the stainless steel having the predetermined metal composition is tightly ahdered on the substrate having the mirror-like surface other than said stainless steel.

(4) Methods for manufacturing metal oxide of the stainless steel by adhering simultaneously oxidizing the stainless steel having the predetermined metal composition on the substrate having the mirror-like surface other than stainless steel.

Among the methods as mentioned above, the most preferable methods are the acidic and alkaline oxidation methods as follows:

(a) The acidic oxidation method.

The oxidation condition is shown as follows;

Sodium dichromate or Potassium dichromate: 100 – 400 g/l or chromium trioxide: 40 – 700 g/l Sulfuric acid: 150 – 800 g/l preferably 400 – 800 g/l Temperature: 50 — boiling point preferably 70° – 120° C Dipping time: 3 – 40 minutes (b) The alkaline oxidation method.

The oxidation condition is shown as follows;

Sodium hydroxide or potassium hydroxide: 130 – 200 g/l

Trisodium or tripotassium phosphate: 30 – 40 g/l ($Na_3PO_4$) ($K_3PO_4$)

Sodium or potassium nitrite : Sodium or potassium nitrate ($NaNo_2$) ($KNO_2$) ($NaNO_3$) ($KNO_3$): 20 – 30 g/l Ferric hydroxide: 1 – 3 g/l Fe(OH)$_3$
Lead peroxide: 20 – 30 g/l
(PbO$_2$)
Temperature: 100° – 150° C
Dipping time: 3 – 50 minutes It is preferable to pretreat the surface of the substrate prior to carrying out the chemical treatment thereon. The preferable pretreating methods are those of dipping said substrate into either the aqueous mixture of one weight part of nitric acid and one weight part of water for an hour or the aqueous mixture of 30 weight % of perchloric acid and 1 weight % of potassium chloride for 2 – minutes.

Said metal oxide coming from the stainless steel consists of those having the chemical formula of FeO (FeCr)$_2$O$_3$ in the ferritic stainless steel and (Fe, Ni) O (Fe.Cr)$_2$O$_3$ in the austenitic stainless steel, the both metal oxides being the spinel structure having the lattice defect.

ROUGHNESS OF THE SUBSTRATE

When the surface state of the substrate having the mirrorlike surface satisfys the following requirements, a sort of the substrate material is not limited in the case of adhering metal oxide of the predetermined composition on the substrate.

(1) To providing the characteristic feature of the selective absorption surface, namely the high reflectance in the infrared ray wave lengths, the metal oxide layer is the transparent in the infrared ray whereby the infrared ray reflects on the substrate passing through the metal oxide layer adhered on the substrate.

(2) The adhesion of the metal oxide layer to the substrate depends on the roughness of the substrate surface. The coating layer adhered on the smooth surface of the substrate becomes dense.

(3) When the surface of the substrate possesses the mirror-like surface in the wave lengths of the visible and near infrared rays, the interference effect does not decrease whereby the effect of preventing the reflection clearly appears. In case that the surface of the substrate becomes rough, the absorptance of solar radiation increases. This, it is left to the maker the choice of either the effect of preventing the reflection or that of increasing the absorptance.

(4) It is preferably to make the mirror-like surface of the substrate smooth to depress the radiation of the infrared ray. If the subsrate becomes exceedingly rough, as the spectroscopic character of the selective surface will depress to such extent that the absorbing wave lengths of the solar ray in the selective absorption surface reaches to the infrared wave lengths of 3 – 8μm, said rough substrate is not suitable. Various kinds of the metal plate, the stainless plate and the plastic plate can be used as the substrate material.

In view of said matters, it has been found that the surface state of the substrate to be adhered metal oxides of the stainless steel thereon is the most important factor to fully display the spectroscopic character of the selective absorption surface in which the absorptance in the wave lengths of the solar radiation is large (namely the reflectance thereof is small), while the emittance in the wave lengths of the infrared ray is small (namely the reflectance thereof is large).

It has been known to be preferably that in order to improve the efficiency of the selective absorption surface, said surface's roughness is large in comparison with the wave length of the solar radiation and is small in comparison with the wave length of the infrared ray. But it has not been confirmed by the experimental data.

Generally speaking, the surface of the substrate roughly finished tends to bring the effect of the increasement of the absorptance by the repeated reflection but to depress the effect of preventing the reflection coming from the interference effect, since said both effects actually depend on the limitations of the roughness of the selective absorption surface.

The another object of the present invention relates to determining the roughness of the substrate surface when metal oxide of the stainless steel is formed on the surface of the substrate. To determine the roughness of the substrate the following experiment has been effected.

The stainless steel having the metal composition of 0.005 – 0.12 wt. % of C, 0.005 – 0.75 wt % of Si, 0.005 – 1.00 wt % of Mn, 16.00 – 18.00 wt % of Cr and the balance being small amount of additional metal and Fe (430 (AISI), 683/XIII 8 (ISO)) was oxidized in the acidic aqueous bath comprising 100 g/l of sodium bichromate and 400 g/l of sulfuric acid at a temperature of 106° – 108° C, for 30 – 35 minutes to form the metal oxide layer on the surface of said stainless steel.

The interrelationships among the absorptance ($\alpha$) integrated over the solar spectrum, the emittance ($\beta$) integrated over the radiation of the black body efficiency ($\mu$) were examined respectively.

The efficiency ($\mu$) is presented by the following equation.

$$\mu = \alpha - \epsilon(\sigma\tau^4/J)$$

Wherein $\sigma$ represents Stefan Boltzmann's constant 4.88 $\times$ 10$^{-8}$Kcal/m$^2$.h K°, $\tau$ represents the corrector operating temperature. Here we assume it 373° K. J represents the solar radiation power (800 Kcal/m$^2$.h). The roughness of the base surface is represented by arithmetical mean deviation (Ra) and ten point height (Rz) according to ISO Recomendation R 468 standard.

Figure 1:
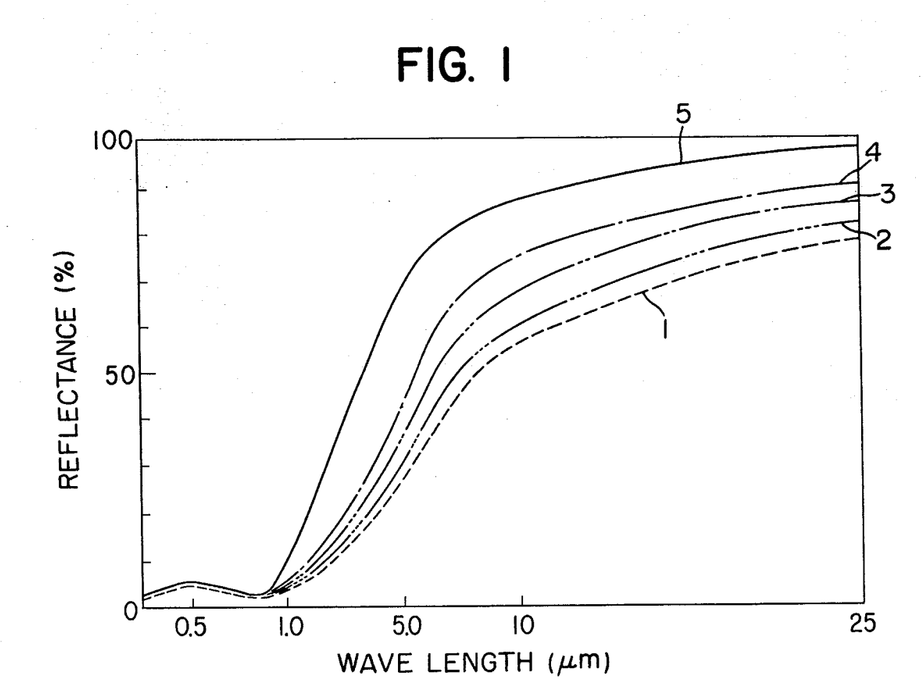
FIG. 1 shows the interrelationship between the wave lengths ($\mu$m) of the solar ray and the reflectance (%) of the selective absorption surface coming from the roughness of the substrate surface.
Figure 2:
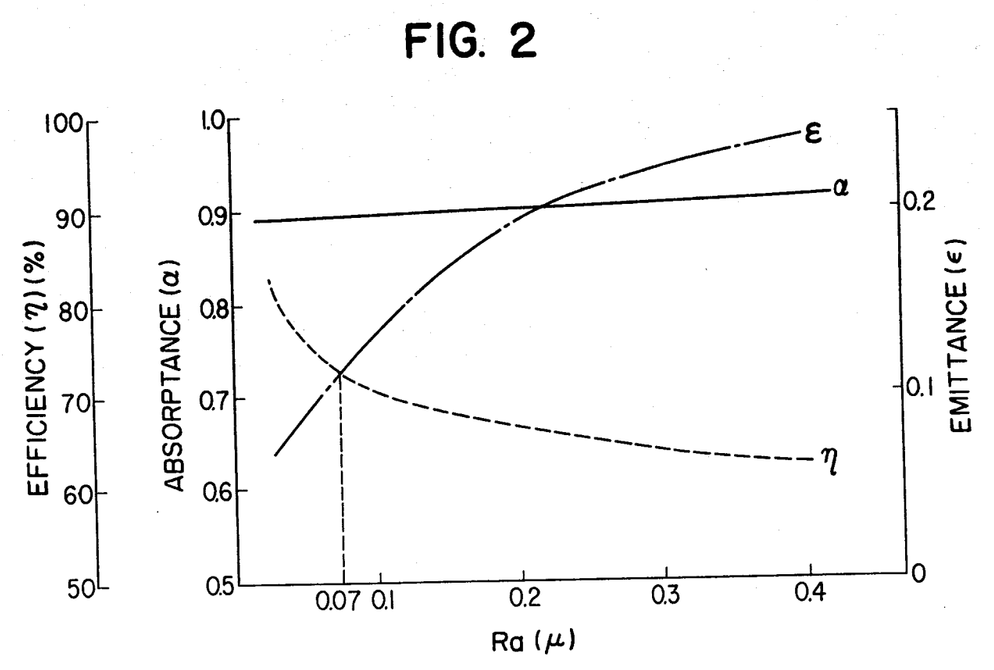
FIGS. 2 and 3 show the interrelationship among the absorptance ($\alpha$), the emittance ($\epsilon$) and the efficiency ( ) of the selective absorption surface and the roughness Ra ($\mu$m) and Rz ($\mu$m) respectively.

The experimental results were shown in FIGS. 1 and 2. In FIG. 1, curve 1 shows the interrelationship between the reflectance and the wave length when the surface's roughness is in Ra 0.36 μm or Rz 3.5 μm; curve 2 shows that in Ra 0.19 μm or Rz 0.6 μm; curve 3 shows that in Ra 0.12 μm or Rz 0.5 μm; curve 4 shows that in Ra 0.08 μm or Rz 0.3 μm; curve 5 shows that in Ra 0.04 μm or Rz 0.1 μm.

It has been observed that the variation of the reflectance is small in comparison with the variation of the roughness of the selective absorption surface of the solar collector in a wave length of the visible ray, while said variation is large in the wave length of the infrared ray. The more the ratio of Ra/Rz becomes small, the more the reflectance becomes large.

FIG. 2 shows the interrelationships among the Ra value, the absorptance ($\alpha$), the emittance ($\epsilon$), and the efficiency ($\mu$). In FIG. 2, the value of the absorptance ($\alpha$) of the selective absorption surface is not too much affected by the value of Ra. The value of the emittance ($\epsilon$) suddenly depresses at the value of Ra less than 0.07, while said value proportionately increases at the value of Ra more than 0.07. The value of the efficiency ($\mu$) suddenly increases at the value of Ra more than 0.07 and shows the value of more than 75%.

It has been observed from FIG. 2 that the superior result is brought from the selective absorption surface manufactured by chemically oxidizing the surface of the stainless steel plate having the value of Ra less than 0.07.

Figure 3:
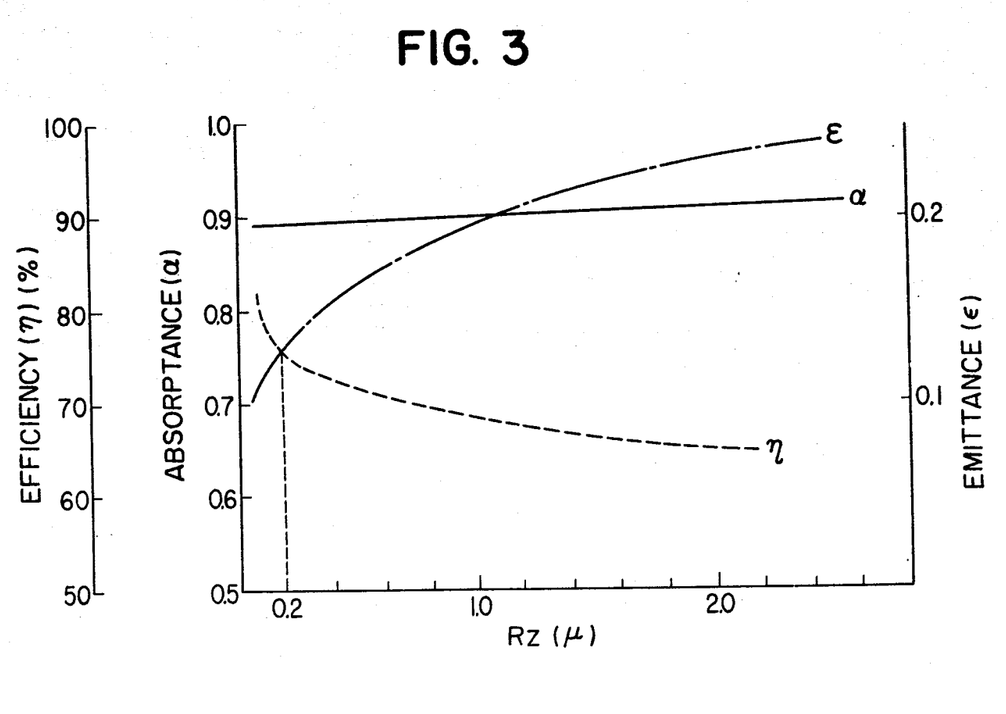

In FIG. 3, the value of the absorptance ($\alpha$) of the selective absorption surface is not too much affected by the value of Rz. The value of the emittance ($\epsilon$) suddenly depresses at the value of Rz less than 0.2, and the efficiency ($\mu$) shows high value more than 75% at the value of Rz less than 0.2.

It has been observed that the superior result is brought from the selective absorption surface manufactured by chemically oxidizing the surface of the stainless steel having the roughness of Rz less than 0.2. The selective absorption surface having the roughness of Ra less than 0.07 or Rz less than 0.2 respectively gives fully smooth surface at the wave length of the infrared ray and gives small ratio of diffused reflectance to the hemispherical reflection (the sum of the mirror reflectance and the diffused reflectance) and prevents the depression of the reflectance coming from the multiplied reflection thereby showing the value of more than 80% of the hemispherical reflection at the infrared wave length more than 7 $\mu$m and outstandingly improving the selective absorption property of the said surface of the solar collector. It is necessary to finish the surface of metal plate to be uniform in order to manufacture the uniform and stable oxide film when the oxidation treatment of the surface of the stainless steel is effected.

Generally speaking, the surface of the stainless steel is nonhomogeneous owing to the metallographical structure, the composition, the working procedure, the local heat-treatment and the distribution of the internal stress. As far as the surface of the stainless steel plate is unhomogeneous, uniform oxide film is not formed.

One of the effects of the present invention is to improve the selective absorption property of the selective absorption surface of the solar collector by finishing the surface of the stainless steel substrate with the roughness of Ra less than 0.07 or Rz less than 0.2 by the mechanical polishing, the chemical abrasion and the electrolytic polishing, removing the many disadvantages coming from unhomogeneous of the metal plate surface. One of the examples showing the efficiency of the selective absorption surface of the solar collector having the appropriate roughness was shown in FIG. 4. In the example, the stainless steel (304 (AISI) 683/XIII 11 (ISO)) was treated by a liquid homing method using glass powders of a particle size of 20 - 100 $\mu$m to form a clean surface having the surface roughness of Ra 0,2 $\mu$m or Rz 1.0 $\mu$m and then oxidized said surface according to the acidic oxidation method of the item (3a).

Figure 4:
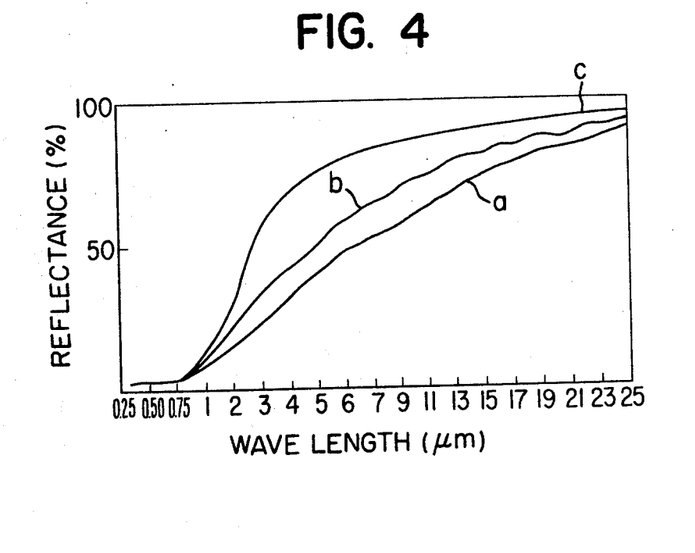
FIG. 4 shows the interrelationship between the wave lengths and the reflectance of the selective surface at various roughness of the substrate.

The spectral reflectance of th oxide film of the stainless steel was shown in the curve (a) of FIG. 4. In the another example, said stainless steel was dipped into the aqueous solution containing 10 wt % of nitric acid and 2 wt % of fluoric acid to form the clean surface having the surface roughness of Ra 0.14 $\mu$m or Rz 0.6 $\mu$m and then oxidized said surface by the method of the item (3a).

The spectral reflectance of the oxide film of the stainless steel was shown in the curve (b) of FIG. 4. In the example of the present invention, the said stainless steel was polished after carrying out with or without mechanical and/or chemical treatment as shown in said example to form the treated surface having the roughness of Ra of less than 0.07 $\mu$m or Rz of less than 0.2 $\mu$m and then oxidized by the acidic oxidation method of the item (3a). The test result was shown in the curve (c) of FIG. 4. It has been observed that the oxide film of the present invention (curve (c)) shows high reflectance at the wave lengths of the infrared ray in comparison with those of the curves (a) and (b).

THICKNESS OF THE OXIDE FILM

It causes the problem how to determine the thickness of the oxide film when metal oxides of the metal composition are adhered on the surface of the substrate according to the following procedures namely.

(1) The method for effecting the acidic or alkaline oxidation to the surface of the stainless steel having the predetermined metal composition.

(2) The particular reactive vacuum evaporating method for example, the spattering and arc discharging methods for improving the adhesive property between the oxide film and the substrate.

(3) The method for adhering the metal oxide powders of the predetermined metal composition on the substrate using a binder having the relative transparency for the infrared ray for example, polyethylene and silicone resin etc.

(4) The method for carrying out the oxidation treatments of the stainless steel tightly adhered to the substrate, except for the stainless steel, for example oxidated chromalyzing metal or clad metal etc.

The spectroscopic charactor of the selective absorption surface of the solar collector and the anti-reflection effect of the oxide film are explained as follows; the spectroscopic character of the selective absorption surface is to have less reflection in the wave lengths (0.3 - 2.5 $\mu$m) of the solar radiation and large reflection in the infrared wave lengths (3 - 50 $\mu$m).

Figure 5:
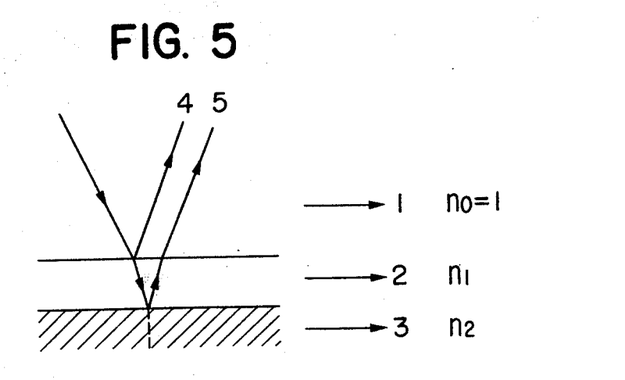
FIG. 5 shows an example of the cross section of the selective absorption surface of the solar collector utilizing the stainless steel as the substrate.

FIG. 5 shows the cross-sectional view of the absorber of the colar collector in which the oxide film is adhered on the substrate having the mirror-like surface to show the reflection of the incident ray on the interfacial surfaces between air and the film and between the film and the substrate respectively.

Figure 6:
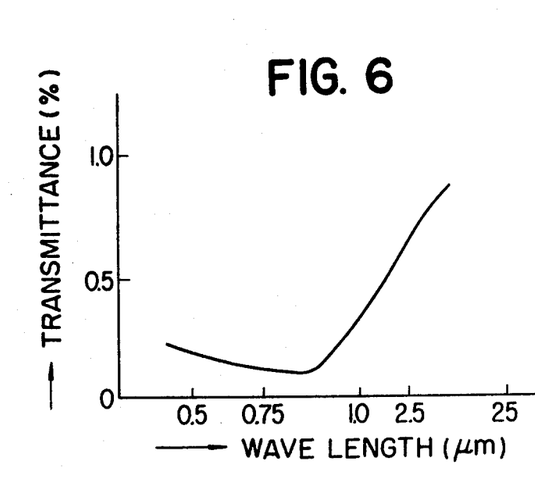
FIG. 6 shows the interrelationship between the wave lengths ($\mu$m) and the transmittance of said oxide film.
Figure 7:
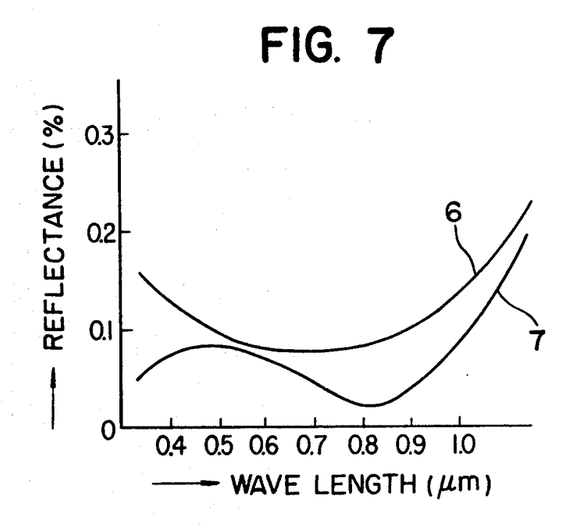
FIG. 7 shows the interrelationship between the wave lengths ($\mu$m) and the reflectance of metal oxide on the stainless steel substrate neglecting the interference effect.

In FIG. 5, the incident ray coming from air 1 is partially reflected on the interfacial surface between air 1 and the oxide film 2 to form the reflection ray 4. The remaining incident ray penetrates through the oxide film 2 with being attenuating and reflected on the interfacial surface between the film 2 and the substrate 3 to form the reflected ray 5. The interference between the rays 4 and 5 depends on the thickness of the oxide film so that the thickness of the oxide film is selected so as to occur the interference action to obtain the effect of preventing the reflection. The curve 6 of FIG. 7 shows the spectroscopic character of the selective absorption surface adhered metal oxide of the stainless steel on the surface of the substrate having the mirror-like surface neglecting the interference effect. FIG. 6 shows the spectroscopic transmitting power of metal oxide of the stainless steel. Said stainless steel possesses the metal composition corresponding to 683/XIII 8 (ISO), and 430 (AISI).

The oxide film mainly comprising chromic oxides and $Fe_3O_4$ ($Fe_2O_3 \cdot FeO$ or $Fe_3O_4$) is produced by dipping the acidic solution of sodium bichromate of 100 g/l and acid of 400 g/l at the temperature of 106° - 108° C for 30 - 35 minutes.

The oxide film of the stainless steel having the appropriate thickness of the coating layer adhered on the substrate having the mirror-like surface displays the considerable selective absorption character neglecting the interference effect. The curve 7 of FIG. 7 shows the superior spectroscopic character of the selective absorption surface having such extent of the thickness of the coating layer that the interference effect reduces the reflectance at the wave length of the solar radiation.

In generally, it has been provided the coating layer of the dielectric material having the intermediate value of the refractive index of the materials having the different optical characters to depress the reflectance at the interfacial surface between the said materials. If said materials possess the perfect transparency, the absorption band coming from the interference effect will sharply appear. Even if said materials possess intermediate properties between dielectrics and electric conductor, the interference effect will appears by the existance of the penetrating ray. Metal oxide of the stainless steel does not possess the perfect dielectric property but the considerable selective absorption property itself.

Figure 8:
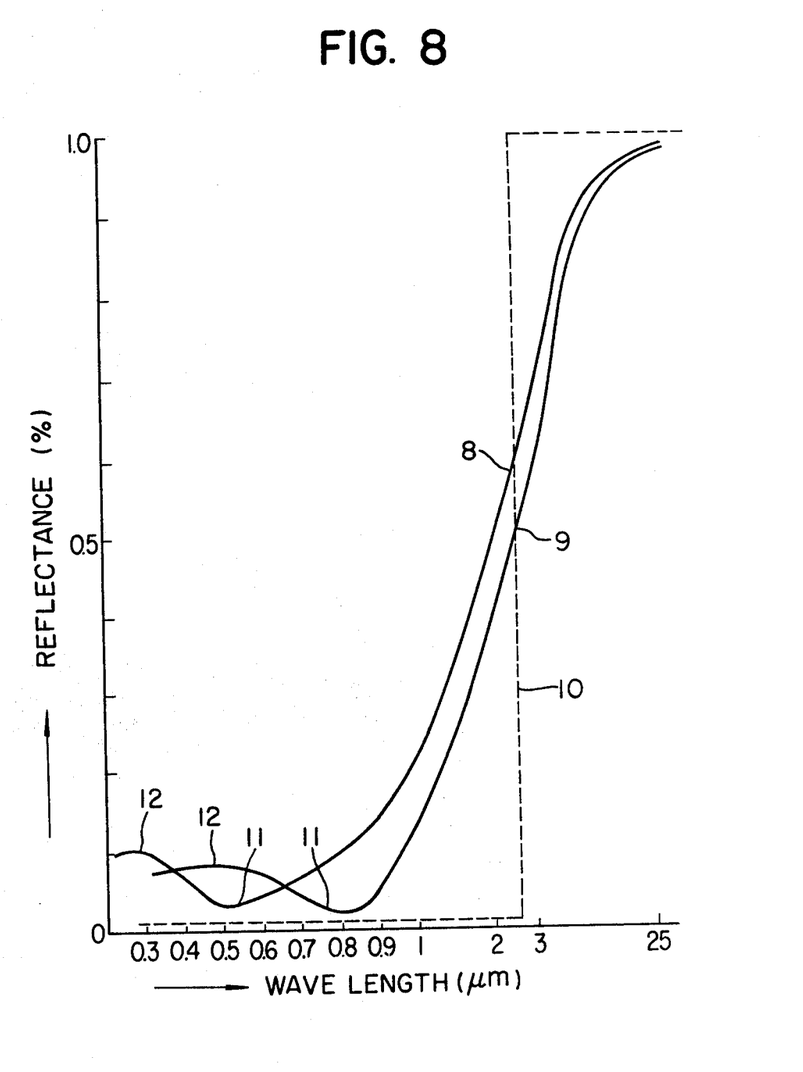
FIG. 8 shows the interrelationship between the wave lengths (μm) and the reflectance (%) of the selective absorption surface of the solar collector.

Therefore, said oxide film can be used as the surface having the selective absorption property taking the interference effect into consideration. It is possible to make the reflectance of the selective absorption surface to the minumum value if the following equations are satisfied.

$$n_1^2 = n_o \cdot n_2 = n_2 \quad \quad 1$$

$$n_1 d = (\lambda/4), (3\lambda/4), (5\lambda/4), (7\lambda/4) \quad \quad 2$$

wherein $n_1$ represents the refractive index of the coating material; $n_o$ represents the refractive index of air ($n_o = 1$); $n_2$ represents the refractive index of the substrate, $d$ represents the thickness of the film, $n_1 d = \lambda/4$ represents the wave length of primary absorption band. If the stainless steel is used as the substrate (3) as shown in FIG. 5, the refractive index $n_2$ was 3.5 – 3.9 while the refractive index $n_1$ was 2.0 –2.5 by the measurement of the ellipsometering analyser. Although the refractive index (2.0 – 2.5) of the film of metal oxide of the stainless steel does not satisfy the equation (1) and the refractive index at the primary absorption wave length does not become null when the optical thickness of said film is $\lambda/4$, whereby said film displays the superior absorptive selection property as shown in the curves 8 and 9 of FIG. 8.

In FIG. 8, the curves 8 and 9 show the spectral reflectance when the wave length of the primary absorption is about 0.5 μm at which spectral emissive power is maximum value and about 0.8 μm respectively. Although it is deduced from the curve 8 that the most superior selective absorption property is shown when the primary absorption wave length (11) is 0.5 μm and that the maximum absorptance of the selective absorption surface is shown at the wave length (11) of the primary absorption of about 0.8 μm taking the spectral distribution of the solar radiation into consideration. Now, when the absorptance ($\alpha$) of the solar radiation of the curves 8 and 9 is calculated on the assumption that the air mass is 2, said values ($\alpha$) of the curves 8 and 9 amount to 0.90 and 0.94 respectively.

In curves 8 and 9 of FIG. 8, the emittance ($\epsilon$) amounts to the same value of about 0.12 at the long wave lengths. The values showing the minimum reflectance in the primary absorption (11) and the primary peak of spectral reflectance (12) in the optical thickness of the film of $\lambda/2$ are somewhat different in the curves 8 and 9 respectively, since the optical constants of dispersion in the metal oxide coating layer and the base plate at the certain wave length are somewhat different respectively. Best selectivity will be better obtained in the wave length of primary absorption 0.8 μm than those of 0.5 μm.

Namely, the minimum reflectance of the curve 9 is smaller than that of the curve 8 in the primary absorption wave length (11), while the maximum reflectance of the curve 9 is smaller than that of the curve 8 in the primary peak wave length (12).

The line 10 of FIG. 8 shows the ideal spectral reflectance curve of the selective absorption surface at the operating temperature of 100° C.

Giving full particulars of the refractive index of metal oxide of said stainless steel, said metal oxide are porous growing up on the surface of the stainless steel in the certain direction.

Generally, the more the porosity becomes large, the more the value of the refractive index becomes near that of air, while the more the porosity becomes small, the more the value of the refractive index becomes near that of the metal oxide.

The refractive index of magnetite ($Fe_3O_4$) is 2.4 – 2.5 in the wave length of the visible ray, while the refractive index of metal oxide of the stainless steel is 2.0 – 2.5 by the measurement of the ellipsometering analyser.

It is concluded from the said matters that the porosity of metal oxide of the stainless steel corresponds to 0 – 20% on the volume basis of th metal oxide layer. Said fact has been confirmed by the measurement of the transmittion microscope.

The suitable thickness (dc) of the coating layer of metal oxide of the stainless steel having the antireflection effect amounts betweem 500 A and 1,250 A, when the optical thickness ($n_1 d$) of said layer represents 1,250 A $\leq n_1 d \leq$ 2,500 A, and the refractive index ($n_1$) represents 2.0 $\leq n_1 \leq$ 2.5. Even if the thickness of the layer is out of the said range, the selective absorption property of the surface considerably appears so that, the suitable thickness of the coating layer is concluded to be 500 A – 2,000 A. The said suitable thickness of the coating layer can be applied to the stainless steel as well as the substrate other than the stainless steel. If the substrate is selected from the material having a high refractive index of more than 4.0, the absorber surface of solar radiation manufactured from said substrate is improved compared with that from the stainless steel substrate.

EXAMPLE 1

The two sorts of the ferrite and austenitic stainless steels having the metal compositions of 683/XIII 8 (ISO), 430 (AISI) and 638/XIII 11 (ISO), 304 (AISI) where chemically oxidized by the following conditions respectively to form the oxide film on the surface of the stainless steel.

Figure 9:
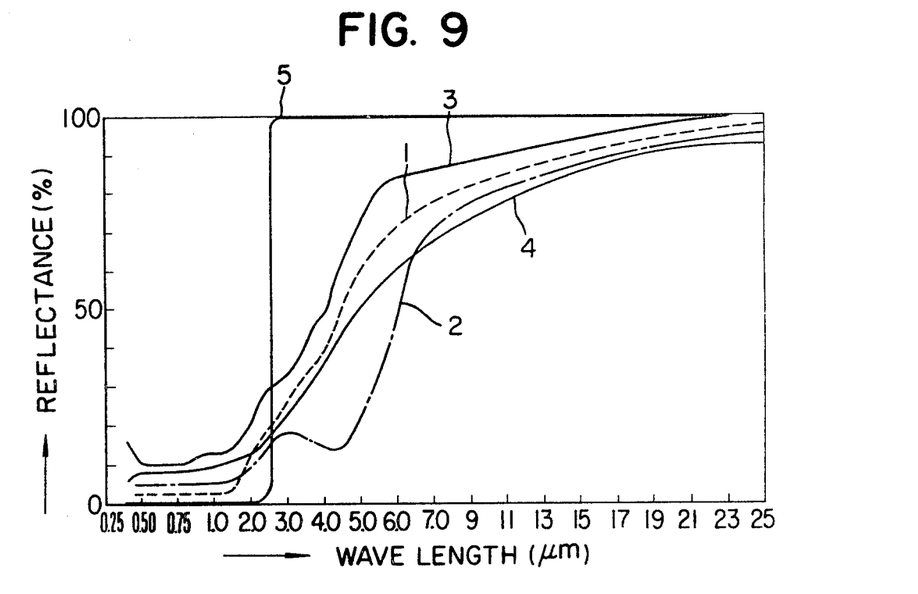
FIG. 9 shows the interrelationship between the wave lengths (μm) and the reflectance (%) of metal oxides coming from the ferritic and austenitic stainless steels respectively.

The oxidation condition
Sodium bichromate: 100 g/l
 ($Na_2Cr_2O_7$)
Sulfuric acid: 400 g/l
 ($H_2SO_4$)
Dipping for 30 – 35 minutes at the temperature of 106° – 108° C FIG. 9 shows the spectral reflectance of the selective absorption surface resulted from the said stainless steels in comparison with that of the ordinary selective absorption surface of the solar collector. In FIG. 9, the curve 1 shows the reflectance of the selective absorption surface of the oxide film manufactured from the ferritic stainless steel, the curve 2 shows that of the oxide film manufactured from the austenitic stainless steel, the curve 3 shows that of the copper oxide coating surface manufactured from the alkaline oxidation of the copper plate, the curve 4 shows that of the nickel sulfide over strike nickel, both being plated on the steel, the curve 5 shows the ideal spectral reflectance of the selective absorption surface of the solar collector at the operating temperature of 100° C. The selective absorption surface coated with copper oxide shows exceedingly high reflectance at the long wave lengths more than 4 $\mu$m. It corresponds to the reflectance of 3 - 5% of higher than that of the selective absorption surface of the oxide film of the stainless steel as shown in the curves 1 and 2, at the wave lengths of solar radiation of 0.3 - 2.5 $\mu$m taking the diffused reflectance into consideration, while in the selective absorption surface manufactured from the ferritic stainless steel as shown in the curve 1, the reflectance is exceedingly small lengths less than 2.0 $\mu$m and considerably high at the wave lengths more than 2.0 $\mu$m. The selective absorption surface manufactured from the ferritic stainless steel is superior, in the same extent to that manufactured from the copper oxide selective surface. As shown in the curve 2 of FIG. 9, the reflectance of the selective absorption surface manufactured from the stainless steel is somewhat inferior to that manufactured from the ferritic stainless steel in the wave lengths of the black body radiation at the same temperature to the operating temperature of the solar collector. Although the selective absorption surface manufactured from the austenitic stainless steel is somewhat inferior in the spectroscopic property, said surface is worthy of the selective absorption surface of the commercial solar collector under the consideration of the superior anticorrosion and welding properties of the austenitic stainless steel.

As mentioned above, the selective absorption of the present invention manufactured from the ferritic and austenitic stainless steels are advantageously usable to the selective absorption surface of the solar collector, as said surfaces possess the good spectroscopic property and the superior anticorrosion and heat resisting properties which are the specific characters of the stainless steel. The metal oxide coating surfaces manufactured from the ferritic and austenitic stainless steels by the chemical oxidation process are an uniform and stable one without injuring the inherent anticorrosion property of the stainless steel.

The heat resisting property of the selective absorption surface manufactured according to the present invention is the same extent to that of the stainless steel, even if the substrate other than that of the stainless steel is used.

Figure 10:
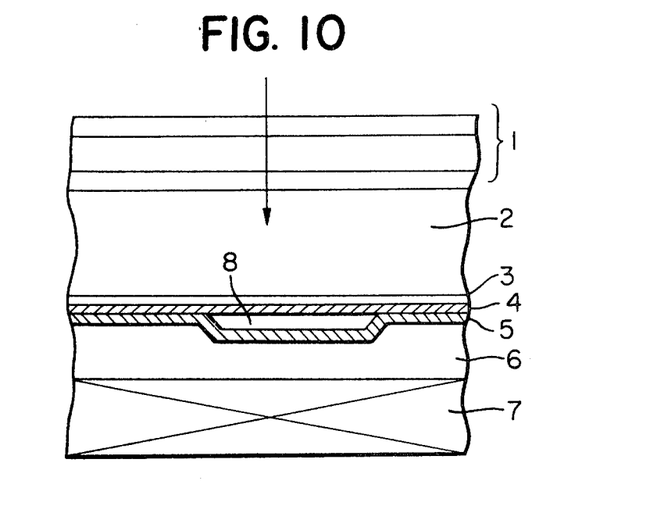
FIG. 10 shows a cross-sectional view of the solar collector with the selective absorption surface.

FIG. 10 shows a cross-sectional view of a suitable solar collector used the selective absorption surface manufctured from the ferritic and austenitic stainless steels. In FIG. 10, an incident solar ray as shown by an arrow is converted to heat by transmitting through transparency cover materials (one to three sheets of glasses or resin plate) which is provided as the protection of convection heat loss and that of exfoliate in the solar radiation and air (2) and absorbed to the oxide film 3 of the ferritic or austenitic stainless steels. The absorbed heat is transmitted to a heating medium such as air and water etc. through the substrate (4) or the another conventional materials 5 bonded on said substrate 4 by the clad method and the diffusion bonding processes. In FIG. 10, the numeral 6 is the air layer provided as the heat insulator, 7 is the insulating material comprising glass wool, asbestos or the honeycomb structure. It has been observed that the selective absorption surface manufactured from the ferritic or austenitic stainless steel by the chemical oxidation process shows the superior effect of collecting heat when said surface is used to the solar collector.

EXAMPLE 2

Figure 11:
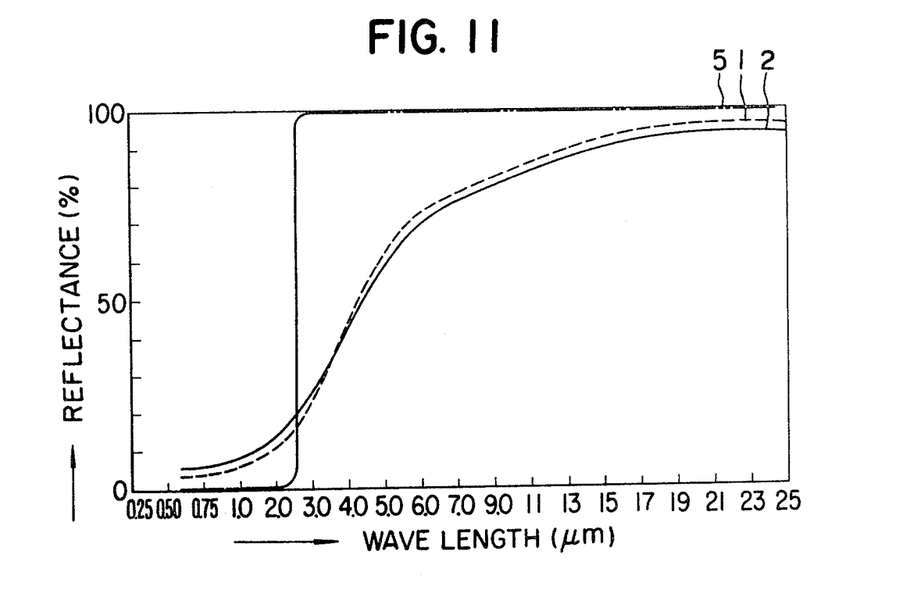
FIG. 11 shows the interrelationship between the wave lengths (μm) and the reflectance (%) of metal oxide of the ferritic stainless steel having low carbon content.

Although the selecting absorption surface manufactured from the ferritic stainless steel having metal composition as shown in the example 1 shows superior spectroscopic property and is cheap in price, it slightly possesses disadvantages of the weldability, the formability and the anti-corrosion property. In order to improve the disadvantages, the low carbon stainless steel was treated under the chemical oxidation condition as shown in the example 1. In FIG. 11, the curve 1 shows the interrelationship between the wave lengths and the reflectance of the selective absorption surface manufactured from said low carbon stainless steel containing Ti, Mo and additional metals, the curve 2 shows the said interrelationship of the selective absorption surface manufactured from the low carbon ferritic stainless steel not containing Ti, Mo and additional metals, the curve 3 shows the ideal curve thereof.

It has been observed from FIG. 11 that the selective absorption surface manufactured from the stainless steel containing additional metals possesses the superior spectroscopic property as well as that of the conventional ferritic stainless steel not containing additional metals.

EXAMPLE 3

The following experiment was effected to prove the fact that the selective absorption surface of the solar collector having the effect of antireflection by the interference effect and the superior spectral reflectance is manufactured by selecting the oxidation conditions of forming the oxide film having the appropriate thickness of 500 - 2,000 A on the surface of the stainless steel.

The stainless steel plate corresponding to the metal composition of 683/XIII 8 (ISO), 430 (AISI) was chemically oxidized by dipping into the aqueous solution of the compositions of (A) and (B) varying the dipping time respectively to form the oxide film on the surface of the stainless steel.

The interrelationship between the thickness (A) of the coating layer and the dipping time (treating time) (FIG. 12) and the interrelationships among the absorptance ($\alpha$) on solar spectrum (the weight of air = 2), the emittance ($\beta$) integrated over the black body radiation as the operating temperature (50° - 100° C) of the solar collector and the thickness A of the coating layer (FIG. 13) were examined respectively.

The conditions of oxidizing the surface of the stainless steel are shown as follows:

(A)

Sodium bichromate ($Na_2Cr_2O_7$): 100 g/l
Sulfuric acid ($H_2SO_4$): 400 g/l
Treating temperature: 106° - 108° C (B)

Figure 12:
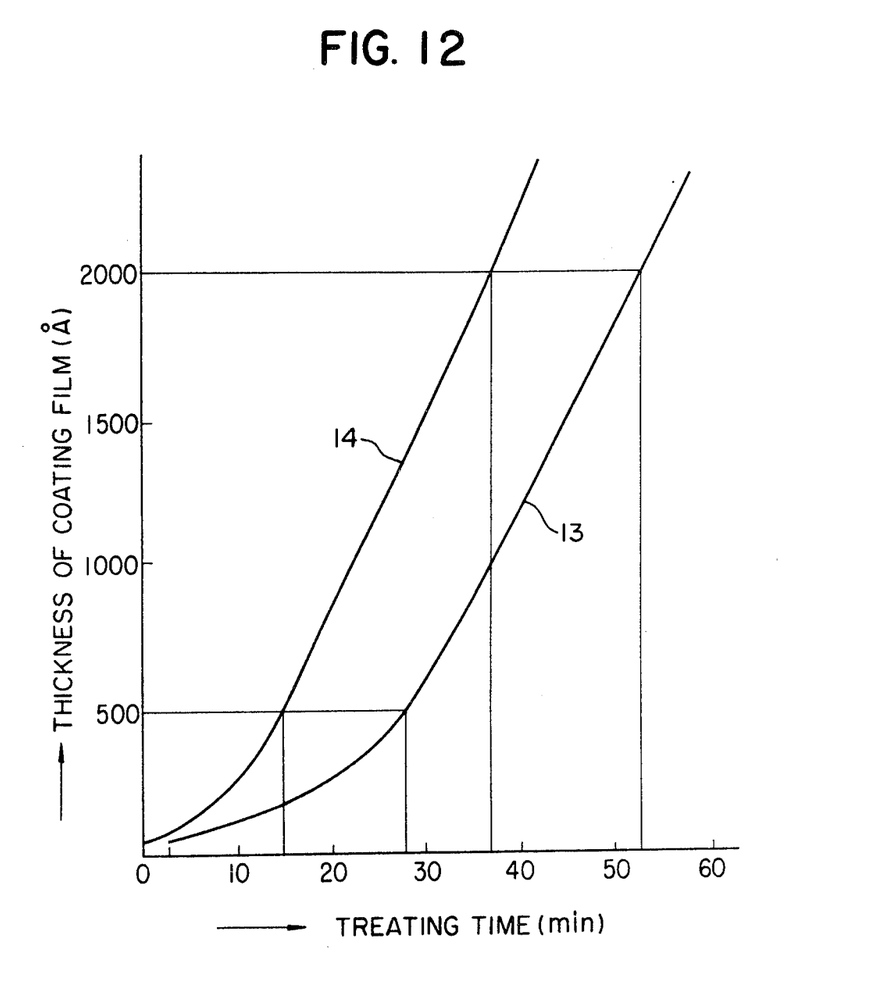
FIG. 12 shows the interrelationship between the thickness (A) of the coating layer and the chemical-treating time (minute) for forming the metal oxide layer of the selective absorption surface of the solar collector.

Chromium trioxide ($CrO_3$): 250 g/l
Sulfuric acid ($H_2SO_4$) 500 g/l
Treating temperature 70° C FIG. 12 shows the interrelationship between the thickness (A) of the coating layer and the treating time (minute) obtained by measuring the variation of the position (the wave length) of the primary absorption in which the optical thickness $n_1 d = \lambda/4$, wherein $n_1$ represents the mean value 2.2 of the aforementioned value of 2.0 – 2.5.

Figure 13:
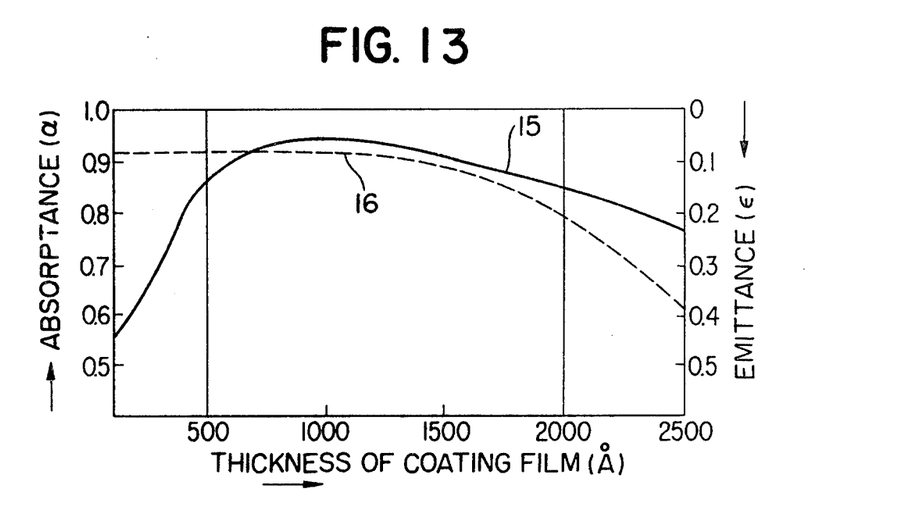
FIG. 13 shows the interrelationships among the thickness (A) of the coating layer and the absorptance ($\alpha$) and the emittance ($\beta$) of the selective absorption surface of the solar collector.

In FIG. 12, the curve 13 is one obtained from the treating condition (A), while the curve 14 is one obtained from the treating condition (B). FIG. 13 shows the interrelationships among the absorptance ($\alpha$) and the emittance ($\epsilon$) at the operating temperature of 100° C of the solar collector and the thickness A of the coating layer. In FIG. 12, the curve 15 is that between the absorptance ($\alpha$) and the thickness of the coating layer, while the curve 16 is that between the emittance ($\epsilon$) and thickness of the coating layer.

It has been observed from the curves 15 and 16 that the value ($\alpha$) is more than 0.80 in the thickness of the coating layer of 500 – 2,000 A, and that the value ($\alpha$) is 0.94 in the thickness of the coating layer of about 900 A when the wave length of the primary absorption coming from the interference effect is 0.8$\mu$m, and that the value ($\alpha$) slowly decreases in the thickness of the coating layer more than 1,000 A.

It has been also observed from the FIG. 13 that the emittance ($\epsilon$) slowly increases until the thickness of the coating layer reaches to about 1,500 A and that the value ($\epsilon$) is more than 0.2 when the thickness of the coating layer reaches more than 2,000 A and that the selective absorption surface having the superior selective absorption property is manufactured when the thickness of the oxide film of the stainless steel reaches 500 – 2,000 A.

In view of the said matters, it has been proved that the selective absorption surface having the superior character is manufactured regardless of the oxidation process of the coating surface when the thickness of the coating layer reaches to 500 – 2,000 A.

The characteristic feature of the selective absorption surface of the present invention are shown as follows:

(1) The selective absorption surface having the superior properties of the endurance, the heat-resistance, the anticorrosion and the adherence is manufactured according to the process of the present invention when the stainless steel is used as the substrate.

(1) In the conventional selective absorption surface comprising copper oxide, the spectroscopic property thereof does not remarkably depresses at a temperature of 180° – 200° C (24 hrs) thereby changing the surface in colour, but depresses at a temperature more than 210° C (24 hrs), since the surface structure of metal oxide is destroyed.

(2) In said conventional copper selective absorption surface, it has been observed from the variations of the surface state and the spectroscopic character of said surface when the said surface is exposed in air that the surface structure of the said surface remarkably depresses by being exposed to rain water thereby causing exfoliate of the metal oxide and that the emittance exceedingly increases in the infrared ray thereby remarkably decreasing the reflectance and lacking the spectroscopic property as the selective absorption surface. In the selective absorption surface of the present invention, such inferior properties as mentioned above have not been observed.

(3) The selective absorption surface having the superior spectroscopic character and the low manufacturing cost is manufactured according to the process of the present invention when the ferritic stainless steel is used as substrate material, but said surface displays the properties of lacking the weldability, the formability and the anticorrosive property in comparison with the property of the austenitic stainless steel. To improve said disadvantages, the said surface is manufactured from the metal composition of low carbon ferritic stainless steel or small amount of the specific additional metals into the ferritic stainless steel or small amount of the specific additional metals into the low carbon ferritic stainless steel, thereby preventing the occurance of the stress corrosion which always generates in the austenitic stainless steel and displaying the mechanical strength in the same extent to that of the austenitic stainless steel.

What is claimed is:

1. A selective absorption surface of a solar collector comprising a coating surface of metal oxide at a thickness of 500 – 2,000 A on the substrate having a mirror-like surface, said substrate surface having a roughness of Ra of less than 0.07 $\mu$ or Rz of less than 0.2 $\mu$ determined according to the method of ISO recommendation R 468, said metal oxide consisting of those of 0.001 – 0.15 wt % of C, 0.005 – 3.00 wt % of Si, 0.005 – 10.00 wt % of Mn, 11.00 – 30.00 wt % of Cr, 0.005 – 22.00 wt % of Ni, optionally 0.75 – 5.00 wt % of Mo and the balance being Fe and possessing properties of high energy absorption factor at a wave length of 0.3 – 2.5 $\mu$m and low energy radiative factor at a wave length of 3 – 50 $\mu$m.

2. A selective absorption surface of a solar collector as claimed in claim 1 in which a metal composition constituting a coating surface of metal oxide is that of the stainless steel (683/XIII 11 (ISO), 304 (AISI)) consisting of 0.005 – 0.08 wt % of C, 0.005 – 1.00 wt % of Si, 0.005 – 2.00 wt % of Mn, 8.00 – 10.50 wt % of Ni, 18.00 – 20.00 wt % of Cr and the balance being Fe.

3. A selective absorption surface of a solar collector as claimed in claim 1 in which a metal composition constituting a coating surface of the metal oxide is that of the stainless steel (683/XIII 20 (ISO), 316(AISI)) consisting of 0.005 – 0.08 wt % of C, 0.005 – 1.00 wt % of Si, 0.005 – 2.00 wt % of Mn, 10.00 – 14.00 wt % of Ni, 16.00 – 18.00 wt % of Cr, 2.00 – 3.00 wt % of Mo and the balance being Fe.

4. A selective absorption surface of a solar collector as claimed in claim 1 in which a metal composition constituting a coating surface of metal oxide is that of the stainless steel (683/XIII 8 (ISO), 430(AISI)) consisting of 0.05 – 0.12 wt % of C, 0.005 – 0.75 wt % of Si, 0.005 – 1.000 wt. % of Mn, 0.005 – 0.60 wt % of Ni, 16.00 – 18.00 wt % of Cr and the balance being Fe.

5. A selective absorption surface of a solar collector as claimed in claim 1 in which a metal composition consisting a coating surface of metal oxide is that of the stainless steel (434 (AISI)) consisting of 0.05 – 0.12 wt % of C, 0.05 – 1.00 wt % of Si, 0.005 – 1.00 wt % of Mn, 0.005 – 0.60 wt % of Ni, 16.00 – 18.00 wt % of Cr, 0.75 – 1.25 wt % of Mo and the balance being Fe.

6. A selective absorption surface of a solar collector as claimed in claim 1 in which the optical thickness of the coating layer is determined on the basis that the wave length of the primary absorption represented by the following formula $n_1 d = \lambda/4$ (wherein $n_1$ represents the refractive index of the coating layer, $d$ represents the thickness of the coating layer, $\mu$ represents the wave length $\mu$m) is about 0.8 $\mu$m.

7. A selective absorption surface of a solar collector comprising a coating surface of metal oxide at a thickness of 500 – 2,000 A on the substrate having a mirror-like surface, said substrate surface having a roughness of Ra of less than 0.07 μ or Rz of less than 0.2 μ determined according to the method of ISO recommendation R 468, said metal oxide consisting of those of 0.001 – 0.15 wt % of C, 0.005 – 3.00 wt % of Si, 0.005 – 10.00 wt % of Mn, 11.00 – 30.00 wt % of Cr and 0.001 – 5.00 wt % of at least one additional element selected from the group comprising N, Cu, Al, V, Y, Ti, Nb, Ta, U, Th, W, Zr, and Hf, optionally, 0.75 – 5.00 wt % of Mo and the balance being Fe and possessing properties of high energy absorption factor at a wave length of 0.3 – 2.5 μm and low energy radiative factor at a wave length of 3 – 50 μm.

8. A selective absorption surface of a solar collector as claimed in claim 7 in which a metal composition constituting a coating surface of metal oxide is that of the stainless steel consisting of 0.005 – 0.03 wt % of C, 0.005 – 0.75 wt % of Si, 0.005 – 1.00 wt % of Mn, 16.00 – 18.00 wt % of Cr, 0.1 – 1.0 wt % of Ti and the balance being Fe.

9. A selective absorption surface of a solar collector as claimed in claim 7 in which a metal composition consisting a coating surface of metal oxide is that of the stainless steel consisting of 0.005 – 0.03 wt % of C, 0.005 – 0.75 wt % of Si, 0.005 – 1.00 wt % of Mn, 16.00 – 18.00 wt % of Cr, 0.1 –1.0 wt % of Ti, 0.75 – 5.00 wt % of Mo and the balance being Fe.

10. A selective absorption surface of a solar collector as claimed in claim 7, in which Me/C + N ratio is more than 5.0, while said ratio is more than 8.0 in the stainles steel comprising Nb, Ta or Ti as the additional element.

11. A selective absorption surface of a solar collector comprising a coating surface of metal oxide at a thickness of 500 – 2,000 A on the substrate having a mirror-like surface, said substrate having a roughness of Ra of less than 0.07 μ or Rz of less than 0.2 μ determined according to the method of ISO recommendation R 468, said metal oxide consisting of those of 0.001 – 0.15 wt % of C, 0.005 – 3.00 wt % of Si, 0.005 – 10.00 wt % of Mn, 11.00 – 30.00 wt % of Cr, 0.005 – 22.00 wt % of Ni, and 0.001 – 5.00 wt % of at least one additional element selected from the group comprising N, Cu, Al, V, Y, Ti, Nb, Ta, U, Th, W, Zr and Hf, optionally, 0.75 – 5.00 wt % of Mo and the balance being Fe and possessing properties of high energy absorption factor at a wave length of 0.3 – 2.5 μm and low energy radiative factor at a wave length of 3 – 50 μm.

12. A process for manufacturing the selective absorption surface of the solar collector, in which the stainless steel having a mirror-like surface having a roughness of Ra of less than 0.07 μ or Rz of less than 0.2 μ determined according to the method of ISO Recommendation R 468, and the metal composition comprising; 0.001 – 0.15 wt % of C, 0.005 – 3.00 wt % of Si, 0.005 – 10.00 wt % of Mn, 11.00 – 30.00 wt % of Cr, 0.005 – 22.00 wt % of Ni, optionally 0.75 – 5.00 wt % of Mo, and the balance being Fe, is chemically oxidized in an acidic bath consisting of 150 – 800 g/l of sulfuric acid and a compound selected from the class consisting of 100 – 400 g/l of sodium, 100 – 400 g/l of potassium bichromate or 40 – 700 g/l of chromium trioxide, at the temperature of 50° C to the boiling point, a dipping time of 3 – 40 minutes to form the oxide film at a thickness of 500 to 2,000 A.

13. A process for manufacturing the selective absorption surface of the solar collector as claimed in claim 12, wherein 0.001 – 5.00 wt % of at least one additional element selected from the class comprising N, Cu, Al, V, Y, Ti, Nb, Ta, U, Th, W, Zr and Hf is present in the composition.

14. A process for manufacturing the selective absorption surface of the solar collector, in which the stainless steel having a mirror-like surface having a roughness of Ra of less than 0.07μ or Rz of less than 0.2μ determined according to the method of ISO Recommendation R 468; and the metal composition comprising; at least one element selected from the class comprising N, Cu, Al, V, Y, Ti, Nb, Ta, U, Th, W, Zr and Hf; 0.001 – 0.15 wt % of C; 0.005 – 3.00 wt % of Si; 0.005 – 10.00 wt % of Mn; 11.00 – 30.00 wt % of Cr; optionally 0.75 – 5.00 wt % of Mo; and the balance being Fe; is chemically oxidized in an acidic bath consisting of 150 – 800 g/l of sulfuric acid and a compound selected from the class consisting of sodium, 100 – 400 g/l of potassium bichromate or 40 – 700 g/l of chromium trioxide, at the temperature of 50° C to the boiling point; and, a dipping time of 3 – 40 minutes to form the oxide film at a thickness of 500 to 2,000 A.

* * * * *

UNITED STATES PATENT AND TRADEMARK OFFICE
CERTIFICATE OF CORRECTION

PATENT NO. : 4,097,311

DATED : June 27, 1978

INVENTOR(S) : Toshihiro Ishibashi et al

It is certified that error appears in the above-identified patent and that said Letters Patent are hereby corrected as shown below:

```
Column  1, line 31, "spectorscopic" should be -- spectroscopic --
Column  2, line 31, "rang" should be -- range --
Column  2, line 56, "( )" should be -- (y) --
Column  3, line 29, take out "14" before "3.00"
Column  3, line 67, "corresponding" should be -- correspond --
Column  4, line 38, "ahdered" should be -- adhered --
Column  5, line 13, "2 -" should be -- 2 - 3 --
Column  5, line 46, "preferably" should be -- preferable --
Column  7, line 51, "th" should be -- the --
Column 11, line 54, "manufctured" should be -- manufactured --
```

Signed and Sealed this

Seventeenth Day of April 1979

[SEAL]

Attest:

RUTH C. MASON
Attesting Officer

DONALD W. BANNER
Commissioner of Patents and Trademarks